United States Patent
Nam et al.

(10) Patent No.: US 8,418,532 B2
(45) Date of Patent: Apr. 16, 2013

(54) STEAM GENERATOR FOR SODIUM COOLED FAST REACTOR, HEAT TRANSFER TUBES THEREOF, AND LEAK DETECTION UNIT FOR HEAT TRANSFER TUBE THEREOF

(75) Inventors: Ho-Yun Nam, Daejeon (KR); Byoung-Hae Choi, Daejeon (KR); Byung-Ho Kim, Daejeon (KR); Jong-Man Kim, Daejeon (KR)

(73) Assignees: Korea Hydro & Nuclear Power Co., Ltd., Seoul (KR); Korea Atomic Energy Research Institute, Daejeon (KR)

( * ) Notice: Subject to any disclaimer, the term of this patent is extended or adjusted under 35 U.S.C. 154(b) by 1276 days.

(21) Appl. No.: 12/413,416

(22) Filed: Mar. 27, 2009

(65) Prior Publication Data

US 2010/0064988 A1    Mar. 18, 2010

(30) Foreign Application Priority Data

Sep. 17, 2008  (KR) .................. 10-2008-0091110

(51) Int. Cl.
*F16L 55/00* (2006.01)
(52) U.S. Cl.
USPC .......... 73/49.5; 122/459; 137/15.11; 138/148
(58) Field of Classification Search .............. 122/459; 137/15.11, 565.01–565.11; 138/148; 73/49.5
See application file for complete search history.

(56) References Cited

U.S. PATENT DOCUMENTS

| | | | | |
|---|---|---|---|---|
| 3,919,880 A | * | 11/1975 | Seyd et al. ............... | 73/49.8 |
| 3,965,675 A | * | 6/1976 | Martz et al. ............. | 60/39.182 |
| 4,216,821 A | * | 8/1980 | Robin ....................... | 165/11.1 |
| 4,217,218 A | * | 8/1980 | Bauer ....................... | 210/761 |
| 4,237,968 A | * | 12/1980 | Duke ........................ | 165/70 |
| 4,368,694 A | * | 1/1983 | Ward et al. ............... | 122/504 |
| 4,519,238 A | * | 5/1985 | Hailey ..................... | 73/40.5 R |
| 4,633,819 A | * | 1/1987 | Tilliette .................. | 122/32 |
| 4,744,412 A | * | 5/1988 | Kim et al. ................ | 165/70 |
| 5,425,415 A | * | 6/1995 | Master et al. ........... | 165/154 |
| 6,073,481 A | * | 6/2000 | Barefoot .................. | 73/49.5 |
| 6,489,894 B2 | * | 12/2002 | Berg ........................ | 340/605 |
| 6,609,483 B1 | * | 8/2003 | Albrecht et al. ........ | 122/479.2 |
| 7,104,292 B2 | * | 9/2006 | Wodjenski .............. | 141/248 |
| 7,775,236 B2 | * | 8/2010 | Gold et al. .............. | 137/487.5 |
| 2005/0224213 A1 | * | 10/2005 | Kammler ................. | 165/81 |
| 2007/0187067 A1 | * | 8/2007 | Horiguchi et al. ...... | 165/70 |

\* cited by examiner

*Primary Examiner* — Steven B McAllister
*Assistant Examiner* — Ko-Wei Lin
(74) *Attorney, Agent, or Firm* — Bardmesser Law Group

(57) ABSTRACT

A steam generator, used in a helical coil type steam generator for a sodium-cooled fast reactor which has heat transfer tubes of a double-wall tube structure, with high heat transfer efficiency and a heat transfer tube damage detection unit that can detect on-line in real-time whether the heat transfer tube is damaged or not. The heat transfer tube of a steam generator for a sodium-cooled fast reactor, includes an inner tube formed with a first material; an outer tube formed with a second material that is in close contact with the inner tube and which has a thermal expansion coefficient less than that of the first material; and a plurality of helium flow grooves formed between the inner tube and the outer tube along a lengthwise direction of the heat transfer tube for flowing helium gas. The inner tube and the outer tube are identically due to heat for the temperature difference generated during normal operation of the steam generator, so the degree of close contact between the inner tube and the outer tube does not decrease, and the decrease of heat transfer efficiency can be prevented.

4 Claims, 11 Drawing Sheets

STEAM GENERATOR FOR SODIUM COOLED FAST REACTOR, HEAT TRANSFER TUBES THEREOF, AND LEAK DETECTION UNIT FOR HEAT TRANSFER TUBE THEREOF

This application claims priority to Korean Patent Application No. 10-2008-0091110, filed on Sep. 17, 2008, the entire contents of which are hereby incorporated by reference.

BACKGROUND OF THE INVENTION

1. Field of the Invention

The present invention relates to a helical coil type steam generator, and more specifically to a heat transfer tube, its leak detection unit and a steam generator for a sodium-cooled fast reactor, whereby the heat transfer efficiency of the heat transfer tube is improved, and it is possible to detect on-line, and in real-time, whether or not the heat transfer tube is damaged, and to alleviate a pressure rise in the steam generator when the heat transfer tube is damaged.

2. Description of the Related Art

Currently, research is under way into a reactor that can breed more than nuclear fuel than it consumes while generating power, but few such reactors have been put to practical use for power generation. Plants for power generation that are being researched with a goal of being put to practical use include a fast reactor (a fast breeding reactor or a liquid metal reactor) which uses uranium and plutonium as nuclear fuel, and liquid metal sodium as coolant, without using a moderator but using nuclear fission of plutonium by fast neutron reactions.

The steam generator for a sodium-cooled fast reactor (SFR) using liquid-state sodium as coolant has an advantage in that the cooling system can be operated at a high temperature and low pressure, since the heat from the low pressure and high temperature sodium flowing on the side of the outer shell of the heat transfer tube is transmitted to the high-pressure and low-temperature water/steam flowing in the heat transfer tube.

A number of problems can arise from a conventional steam generator for a fast reactor:

First, single-wall tubes are mainly used as the heat transfer tube of the conventional steam generator for the fast reactor, but double-wall tubes are also used to prevent the danger of sodium and water leaks. In the case of the double-wall tubes, if gas fills a space between an inner tube and an outer tube, the heat transfer efficiency is lowered, so it is important to keep them in close contact to prevent this. But in conventional double-wall tubes, the inner tube and the outer tube are made of the same material, so the degree of heat expansion is different between the outer tube that is in contact with high-temperature sodium and the inner tube that is in contact with water of a relatively low temperature. Therefore, there is a problem when the degree of close contact between the inner tube and the outer tube is lowered, and heat transfer efficiency is lowered. In particular, the problem of low heat transfer efficiency becomes more serious as a temperature difference between the inner tube and the outer tube increases.

Also, if cracks occur because the heat transfer tube is damaged due to corrosion of the heat transfer tube or thermal imbalance in the steam generator, the high-pressure water or steam leaking through the cracked portion comes into contact with sodium, causing a chemical reaction. As a result, a high-temperature corrosive reaction product and a large quantity of hydrogen gas are generated, and the system could be damaged.

Methods for detecting such damage to the heat transfer tube are known. As one of the methods for detecting the damage to the heat transfer tube with double-wall tubes, a fine groove is formed lengthwise between the inner tube and the outer tube, and whether or not the heat transfer tube is damaged is detected by using pressure change of the helium gas injected into this groove. Such damage detection methods using helium gas include a method in which shared helium plenum is formed in the steam generator and the composition of gas is analyzed or the pressure change in the shared helium plenum is measured, and a method in which the composition of helium gas is analyzed outside the steam generator.

But the former has a problem that when the inner tube is broken the relevant heat transfer tube is closed to shut off leakage but if the outer tube is broken it is not possible to isolate the broken heat transfer tube separately so sodium flows into the shared helium plenum to cause a loss of the damage detection function. And the latter also has a problem that if both the inner tube and the outer tube were broken the heat transfer tubes can be isolated, but since all heat transfer tubes are exposed outside the probability of causing a serious accident such as the heat transfer tube being fractured is increasing. Therefore, there is a need to develop a means or method of detecting the damage to the heat transfer tube of the steam generator for a fast reactor that can detect the breakdown of the heat transfer tube on-line at all times.

In addition, a steam generator has a free liquid surface formed on the top for sodium and cover gas to contact each other. But as the free liquid surface is fluctuating, the surface temperature of the heat transfer tube fluctuates due to the high-temperature sodium and the cover gas of relatively low-temperature, which becomes a cause for generating thermal fatigue of the heat transfer tube. Especially in the conventional steam generator, the space of free liquid surface is wide, so the amplitude of fluctuation is large, and due to this the thermal fatigue of the heat transfer tube is high.

SUMMARY OF THE INVENTION

Therefore, It is an object of the present invention to provide a helical coil-type steam generator for a fast reactor having high heat transfer efficiency and a double-wall tube structure.

It is another object of the present invention to provide a damage detection system for a heat transfer tube that can detect on-line and in real-time whether the heat transfer tube is damaged.

It is yet another object of the present invention to provide a damage detection system for a heat transfer tube that can prevent the loss of the damage detection function when the heat transfer tube is damaged.

It is still another object of the present invention to provide a steam generator that can alleviate the pressure rise in the steam generator while emergency action is taken, when a reaction of sodium and water occurred due to damage to the heat transfer tube.

It is yet still another object of the present invention to provide a steam generator for a sodium-cooled fast reactor that alleviates the thermal fatigue phenomenon of the heat transfer tube generated by the fluctuation of the free liquid surface on the top of the steam generator.

According to one aspect of the present invention, to achieve the above objects, there is provided a double-wall heat transfer tube of a helical coil type steam generator for a sodium-cooled fast reactor, comprising an inner tube formed with a first material; an outer tube formed with a second material that is formed in close contact with the inner tube and has a thermal expansion coefficient less than that of the first material; and a plurality of helium flow grooves formed between the inner tube and the outer tube along a lengthwise direction of the heat transfer tube for flowing helium gas.

In accordance with one embodiment of the present invention, the inner tube and outer tube may be inserted concentrically to be formed by a drawing process, and residual stress may be formed in the interface between the inner tube and the outer tube. In addition, the thermal expansion coefficient of the second material may be from 10 to 15% less than that of the first material.

In accordance with one embodiment of the present invention, the first material and the second material may be chromium molybdenum steel (Cr—Mo steel) having different contents of chromium or molybdenum from each other.

According to another aspect of the present invention to achieve the above objects, there is provided a damage detection system for a heat transfer tube that can detect on-line and in real-time whether the heat transfer tube is damaged. In particular, the heat transfer tube damage detection unit of a steam generator for a sodium-cooled fast reactor, includes a heat transfer tube that includes an inner tube, an outer tube made of material having a thermal expansion coefficient less than that of the inner tube, and helium flow grooves formed between the inner tube and the outer tube for flowing helium gas; a plurality of detection holes formed by penetrating a lower tube sheath that has the heat transfer tube joined, so as to communicate with helium flow grooves; a helium plenum that is connected with detection holes for the helium gas of helium flow grooves to be flowed into; and a pressure gage for measuring the pressure of the helium gas flowing into the helium plenum to detect whether or not the heat transfer tube is damaged.

In accordance with one embodiment of the present invention, the first valves may be provided on the connecting tubes for connecting the detection holes and the helium plenum, and the first valves are installed on the connecting tubes in a normally open state, and can close each connecting tube when the heat transfer tube is damaged.

In accordance with one embodiment of the present invention, a helium tank and vacuum pump for selectively pressurizing and depressurizing the helium plenum may be provided for one side of the helium plenum.

In accordance with one embodiment of the present invention, second valves may be provided on the connecting pipes for connecting the helium plenum, helium tank, and vacuum pump, and the second valves are installed on the connecting pipes in normally closed state, and are provided to doubly close the connecting pipes among the helium plenums, the helium tank, and the vacuum pump.

In accordance with one embodiment of the present invention, a plurality of heat transfer tube holes for heat transfer tubes to be inserted and joined may be formed in the lower tube sheath, and the outer tube of the heat transfer tube may be joined to a first surface of the lower tube sheath. The inner tube of the heat transfer tube penetrates the heat transfer tube hole to be joined to a second surface of the lower tube sheath, and a gap communicating with the helium flow grooves may be formed between the heat transfer tube holes and the inner tube.

For example, the heat transfer tube holes may be radially arranged along the lower tube sheath, and each of the detection holes communicates with each of the heat transfer tube holes, and may be formed so as to communicate with its side along the direction of the radius of the lower tube sheath, and a plurality of detection holes that communicate with a plurality of the heat transfer tube holes arranged on a straight line along the direction of the radius of the lower tube sheath may be formed in different depths in the lower tube sheath.

According to yet another aspect of the present invention, to achieve the above objects, there is provided a double-wall heat transfer tube and a damage detection system for a heat transfer tube that can detect on-line and in real-time whether or not the heat transfer tube is damaged, and thereby can alleviate the pressure rise in the steam generator when a reaction of sodium and water occurs due to damage to the heat transfer tube. In particular, the steam generator for a sodium-cooled fast reactor includes heat transfer tubes of a double-wall structure provided with an inner tube and an outer tube made of material having a thermal expansion coefficient less than that of the inner tube; an inner shroud in which a pressure buffer space is formed and cover gas is supplied therein; a heat transfer tube coil portion formed by the heat transfer tubes wound in a coil form outside the inner shroud; a damage detection unit provided below the heat transfer tube coil portion, on one side of the lower tube sheath, and joined to the heat transfer tubes so as to detect whether or not the heat transfer tube is damaged; and a rupture disk provided on the top of the inner shroud so that when the heat transfer tube is damaged, it is ruptured by pressure rise due to the reaction of sodium and water and the gas generated from the heat transfer tube coil portion flows into the pressure buffer space.

The steam generator of the present invention may further comprise an outer shroud (housing) for housing the heat transfer tubes and the heat transfer tube coil portion; a main shell for housing the outer shroud; an upper shell in which a sodium inflow part, formed so as to supply the sodium flowing in from the reactor to the heat transfer tube coil portion, is provided on the top of the main shell; an upper tube sheath provided on the top of the upper shell for the heat transfer tubes to be joined; a steam header which is connected with the heat transfer tubes through the upper tube sheath so that the steam flowing out from the heat transfer tubes flows out; a lower shell in which a sodium outflow part, formed to supply to the reactor the sodium flowing out from the heat transfer tube coil portion, is provided in the lower portion of the main shell; a lower tube sheath provided below the lower shell for the heat transfer tube to be joined thereto; and a water supply header provided below the lower tube sheath that is connected with the heat transfer tubes through the lower tube sheath so as to supply water to the heat transfer tube.

In accordance with one embodiment of the present invention, a cover gas space may be formed above the heat transfer tube coil portion in the upper shell to absorb the volume expansion of sodium, and a free liquid surface where cover gas is filled, for sodium and cover gas to contact, is formed in the cover gas space. In addition, the outer shroud may extend from inside the cover gas space to a location higher than the free liquid surface of sodium, so that the heat fatigue of the heat transfer tube is alleviated. Preferably, the steam generator of the present invention further includes a heat transfer tube protecting membrane, so as to enclose the outside of the heat transfer tube in the cover gas space. Preferably, a plurality of sodium flow holes for sodium to flow in and out of the heat transfer tube protecting membrane are formed in the portion of the heat transfer tube that is submerged in sodium. A plurality of cover gas flow holes for cover gas to flow in and out of the heat transfer tube protecting membrane are formed above the sodium free liquid surface.

In accordance with one embodiment of the present invention, a plurality of pressure maintaining holes may be formed in the upper portion of the inner shroud to communicate the cover gas space and the pressure buffer space.

In accordance with one embodiment of the present invention, a shell gap may be formed between the outer shroud and the main shell, and the shell gap may communicate with the sodium inflow part and sodium outflow part to bypass through the shell gap a part of sodium that flows into the sodium inflow part. Therefore, it is capable of compensating for the quantity of heat lost to the outside from the surface of the steam generator The steam generator of the present invention may further comprise a flow distribution type support that is provided above and below the heat transfer tube coil portion, so as to maintain the flow rate of sodium uniform and to support the heat transfer tubes. For example, the flow distribution type support may have a plurality of orifices having different diameters formed to regulate the flow rate of sodium uniformly. Therefore, the steam generator can uniformly maintain the flow rate of the sodium that flows into and out of the heat transfer tube coil portion.

The present invention having the above structure provides the following advantages.

First, by providing a heat transfer tube of a double-wall tube structure consisting of an inner tube and an outer tube having a heat expansion rate 10 to 15% higher than the heat expansion rate of the inner tube, the inner tube and the outer tube expand similarly due to heat so as to improve the heat transfer efficiency.

Second, by flowing helium gas into the groove formed lengthwise of the heat transfer tube and connecting each groove to the helium plenum through the lower tube sheath to measure the change of pressure of helium gas, it is possible to detect on-line in real-time whether the heat transfer tube is damaged.

Third, by connecting the heat transfer tubes to the helium plenum through tubes and valves so as to close the tubes or the valves by operation of the valves when the heat transfer tube is damaged, it is possible to shut off sodium from flowing into the damaged detection unit and prevent the loss of the detection unit function due to sodium inflow.

Fourth, by communicating the cover gas space on the top of the steam generator with the buffer space inside and further including a rupture disk, it is possible to alleviate pressure rise by a leak to the buffer space from hydrogen gas generated due to the reaction of sodium and water when the heat transfer tube is broken. Especially, the internal space where the heat transfer tube is wound can be utilized, and the size of buffer space is sufficiently large, so it is possible to alleviate pressure rise effectively when the heat transfer tube is broken.

Fifth, by raising the upper external cylinder up to the cover gas space and further including the heat transfer tube protecting membrane, it is possible to suppress the fluctuation of the sodium free liquid surface in the cover space and effectively alleviate the thermal fatigue of the heat transfer tube due to the fluctuation of the free liquid surface.

BRIEF DESCRIPTION OF THE DRAWINGS

These and other objects, features, and advantages of preferred embodiments of the present invention will be more fully described in the following detailed description, taken in conjunction with the accompanying drawings. In the drawings.

DETAILED DESCRIPTION OF THE INVENTION

Figure 1:
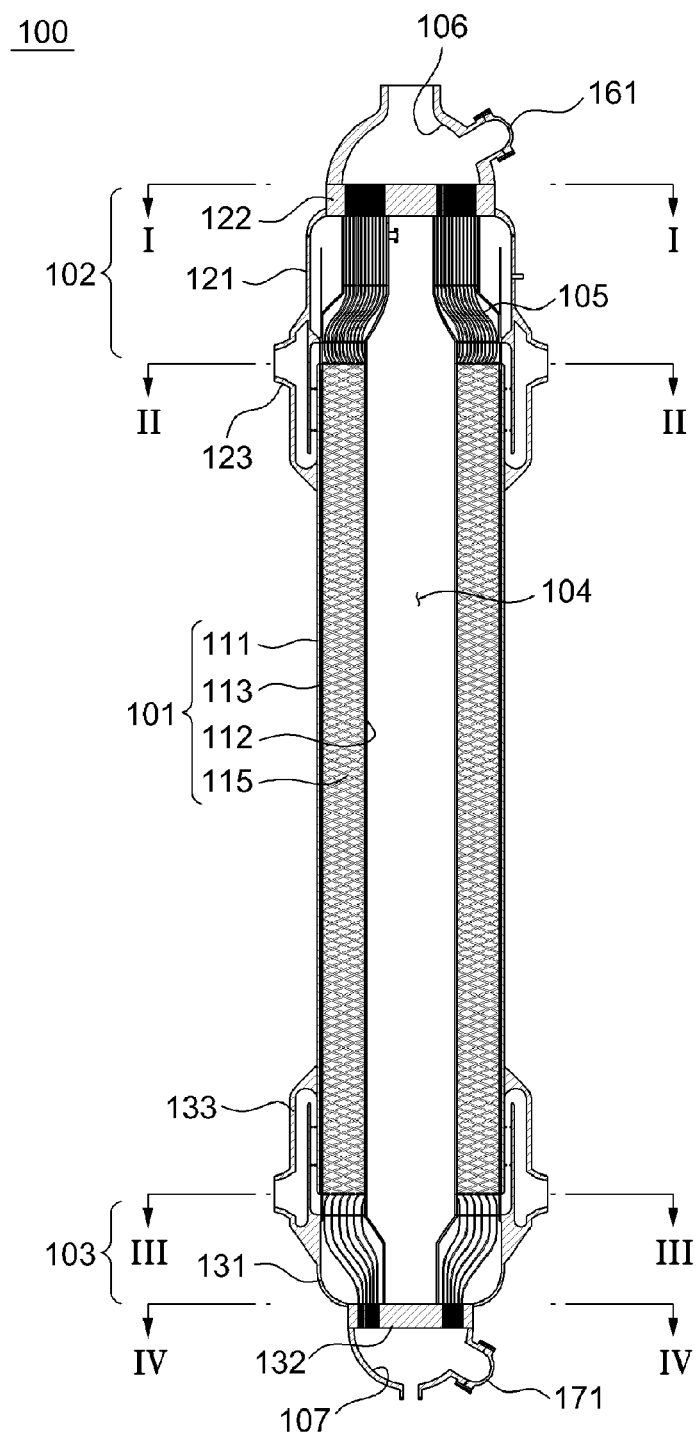
FIG. 1 is a longitudinal sectional view illustrating a steam generator for sodium-cooled reactor according to a preferred embodiment of the present invention.

Hereinafter, the preferred present invention will be described in more detail with reference to the accompanying drawings. When adding reference numerals into constituents in each drawing set forth herein, like reference numerals refer to like elements throughout even they are shown in other drawings.

Steam Generator

Below, the steam generator for a sodium-cooled fast reactor according to a preferred embodiment of the present invention will be described with reference to FIG. 1.

Referring to FIG. 1, the steam generator 100 for a sodium-cooled fast reactor (SFR) contains sodium supplied from an intermediate heat exchanger and generates high-pressure steam for power generation by using the heat of sodium. Namely, a helical coil type steam generator 100 is provided with a heat transfer tube coil portion 115 in which bundles of heat transfer tubes 105 are wound in a helical coil type fashion. And the sodium that is heated at the core of the fast reactor flows outside the heat transfer tube 105 and water flows inside the heat transfer tube 105, so that heat is transmitted from low-pressure high-temperature sodium to high-pressure low-temperature water to generate steam. The heat transfer tubes 105 provide a flow channel for water to flow, playing a role of making heat transfer of the water and sodium isolated from each other.

Although, a steam generator using liquid-state sodium is described in this embodiment, the present invention is not limited thereto. For instance, it should be noted that it is possible to use various other reactive metal materials that have excellent thermal capacity and smooth flow characteristics in a liquid state.

The steam generator 100 can be divided into a main body 101 of a cylinder shape in which the heat transfer tube coil portion 115 is housed, an upper header part 102, and a lower header part 103.

In detail, the main body 101 includes an inner shroud (housing) 112, an outer shroud 113, and a main shell 111 for housing the outer shroud 113. The heat transfer tube coil portion 115 has a bundle of heat transfer tubes 105 wound in a helical type along the outer circumference of the inner shroud 112. The upper header part 102 includes an upper shell 121 having a sodium inflow part 123 formed therein, an upper tube sheath 122, and a steam header 106. The lower header part 103 includes a lower shell 131 having a sodium outflow part 133 formed therein, a lower tube sheath 132 and a water supply header 107.

The main shell 111 forms the appearance of the steam generator 100. The inner shroud 112 and the outer shroud 113 house the heat transfer tube coil portion 115 to protect the heat transfer tubes 105, and define the flow channel of sodium to provide space for heat exchange between sodium and water to occur. Especially, the inner shroud 112 is formed in the minimum diameter so as to wind the heat transfer tubes 105 in a coil form. The space of a predetermined volume formed inside the inner shroud 112 functions as a pressure buffer space 104 for alleviating pressure rise due to reaction of sodium and water when the heat transfer tube 105 is damaged.

The inside of the pressure buffer space 104 is filled with cover gas. Preferably, argon gas is used as cover gas, for instance.

The heat transfer tube coil portion 115 is wound at an incline at a predetermined angle with respect to the horizontal level, along the outer circumference of the inner shroud 112, in an overlap of a plurality of rows of heat transfer tubes 105. For example, the heat transfer tubes 105 of odd numbered rows from the side that are close to the inner shroud 112 may be wound clockwise, and the heat transfer tubes 105 of even numbered rows may be wound counterclockwise.

The top end portions and the bottom end portions of the heat transfer tubes 105 are joined to the upper tube sheath 122 and the lower tube sheath 132, respectively. At this time, the top ends of the heat transfer tubes 105 penetrate the upper tube sheath 122 to communicate with the steam header 106, and its bottom ends penetrate the lower tube sheath 132 to communicate with the water supply header 107.

The sodium inflow part 123 and the sodium outflow part 133 are formed so as to communicate with the heat transfer tube coil portion 115. High-temperature sodium that flowed into the sodium inflow part 123 flows into the heat transfer tube coil portion 115 between the inner shroud 112 and outer shroud 113, and descends down riding on the bundle of the heat transfer tubes 105 in the heat transfer tube coil portion 115 while heating the water inside the heat transfer tubes 105, before it flows out through the sodium outflow part 133 below. And while the water that flowed into the water supply header 107 rises through the heat transfer tubes 105, it is heated to a superheated steam condition by the heat supplied from sodium through the heat transfer tube coil portion 115, before it flows out through the steam header 106.

Meanwhile, the steam header 106 and the water supply header 107 are provided with inspection ports 161 and 171 to inspect the heat transfer tubes 105 and plug damaged heat transfer tubes 105.

Upper Header Part

Below, the upper header part 102 will be described in more detail with reference to FIG. 2. For reference, FIG. 2 is a longitudinal sectional view illustrating the upper header part 102 of the steam generator 100 shown in FIG. 1.

Figure 2:
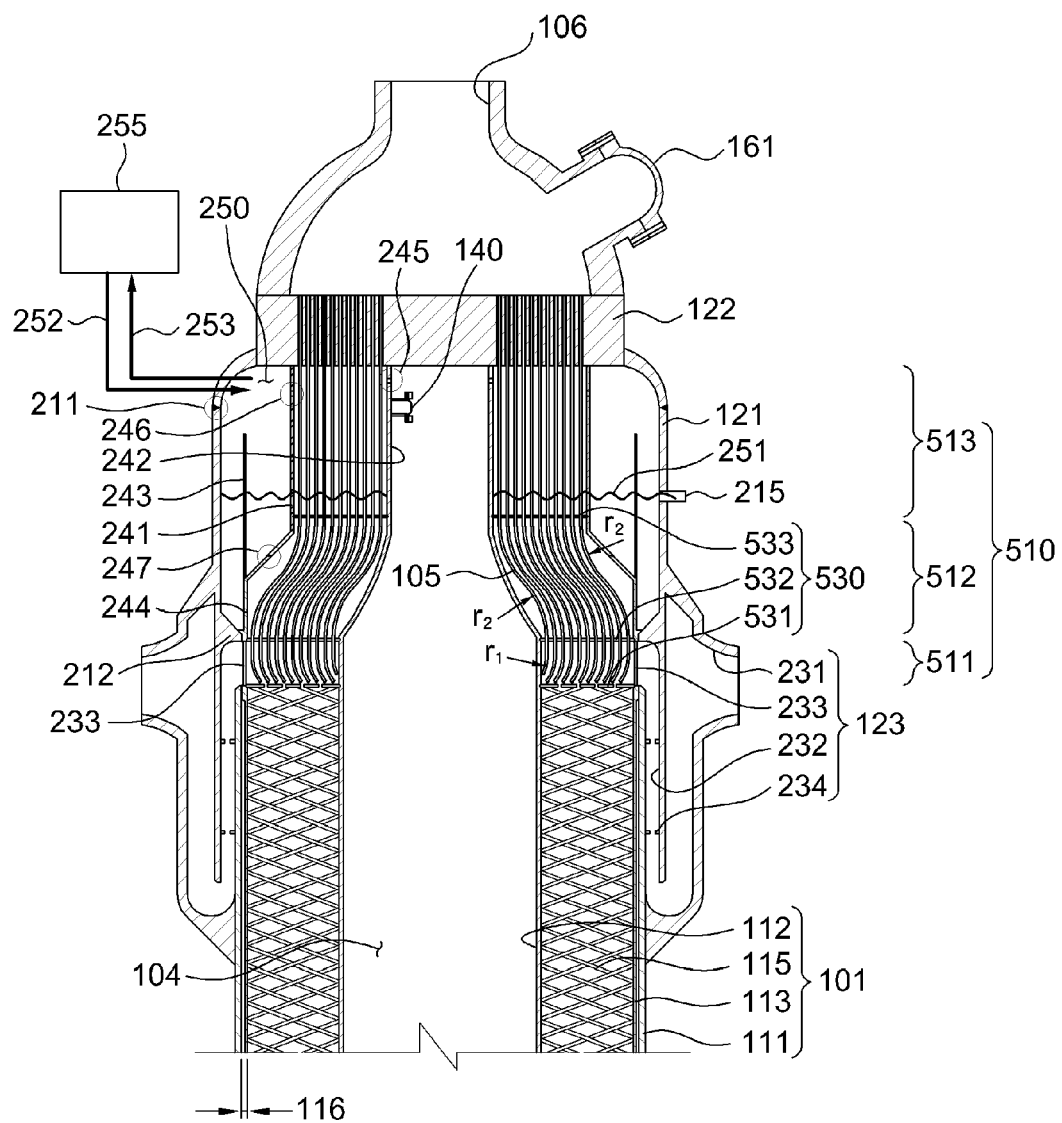
FIG. 2 is a longitudinal sectional view illustrating an upper header of the steam generator shown in FIG. 1.

Referring to FIG. 2, the upper header part 102 is provided with an upper shell 121, an upper tube sheath 122, a sodium inflow part 123, and a steam header 106.

The upper portions of the heat transfer tubes 105 that are elongated and connected to the upper tube sheath 122 are provided with an upper heat transfer tube support part 530 and an upper heat transfer tube connection part 510 for supporting the heat transfer tubes 105 between the heat transfer tube coil portion 115 and the upper tube sheath 122. In the upper heat transfer tube connection part 510, the heat transfer tube 105 is bent at a predetermined bending radius to be joined to the upper tube sheath 122 in the portion where the heat transfer tube coil portion 115 is terminated. The upper heat transfer tube support part 530, which supports the upper heat transfer tube connection part 510, is provided with a flow distribution type upper support 531, a first support 532 and a second support 533 in sequence upward from the heat transfer tube coil portion 115.

In detail, the upper heat transfer tube connection part 510, which is joined to the upper tube sheath 122, is provided with a first bending portion 511, where the heat transfer tube 105 is bent at bending radius r1, between the flow distribution type upper support 531 and the first support 532. A second bending portion 512 is where the heat transfer tube 105 is bent at bending radius r2 between the first support 532 and the second support 533. A straight-line portion 513 is formed in a straight line after passing the second support 533. For example, the heat transfer tube 105 is bent at a bending radius r1 of 520 mm in the portion where the heat transfer tube coil portion 115 is terminated and at 60° with respect to the upper support 531, to form the first bending portion 511, before it passes across the first support 532. Subsequently, the heat transfer tube 105 is bent twice at a bending radius r2 of 600 mm and at 45° with respect to the horizontal to form the second bending portion 512.

The upper tube sheath 122 has a plurality of holes for joining heat transfer tubes 105, so they can be inserted into the holes before they can penetrate the upper tube sheath 122 and then be joined to it. At this time, the heat transfer tube 105 has only its appearance fixed by welding below the upper tube sheath 122, and after it penetrates the upper tube sheath 122, both of its inner tube and outer tube are fixed to the upper tube sheath 122 by welding above the upper tube sheath 122 of the opposite side.

The upper shell 121 that is joined to the main shell 111 has the sodium inflow part 123 formed on one side so as to communicate with the heat transfer tube coil portion 115 and has the upper tube sheath 122 and the steam header 106 provided above it.

The inside of the upper shell 121 is provided with an upper inner shroud (housing) 242 for housing the upper heat transfer tube connection part 510, an upper outer shroud (housing) 243 and a heat transfer tube protecting membrane 241. Inside the upper shell 121 there is also a cover space 250 for absorbing the volume expansion of sodium.

The upper shell 121 mounted on the top of the main shell 111 is joined to the upper shell weld portion 211 by welding. Here, the outer shroud 113, the outer shroud connection portion 244 and the upper outer shroud 243 have a structure in which they are not fixed by welding to the upper shell 121 or the main shell 111 but are simply mounted in contact with each other. For example, the upper shell 121 has an engaging protrusion 212 formed inside and the outer shroud connection portion 244 has a protrusion formed in correspondence to the engaging protrusion 212, and is mounted such that the outer shroud connection portion 244 is engaged on the engaging protrusion 212.

The sodium inflow part 123 includes an inlet nozzle 231 communicating with the reactor (not shown), an inflow opening 233 communicating with the heat transfer tube coil portion 115, and an inlet passage 232 in which sodium flows between the inlet nozzle 231 and inflow opening 233.

Figure 5:
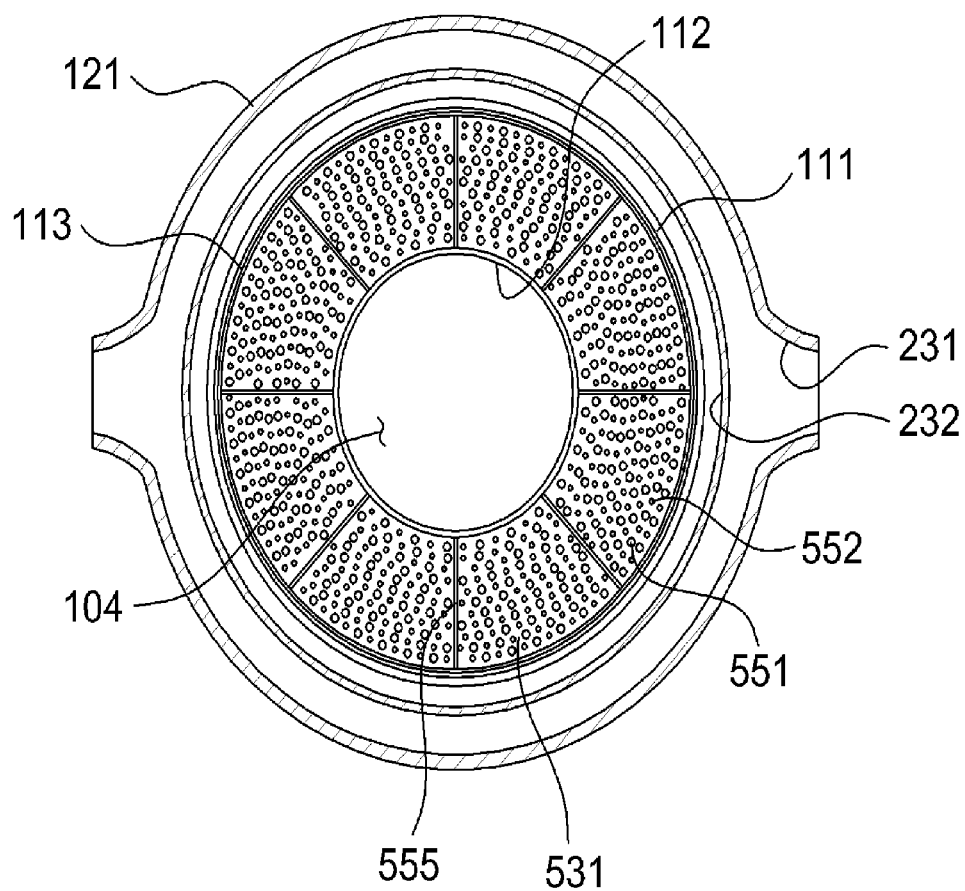
FIG. 5 is a cross sectional view illustrating the flow distribution type upper support taken along line II-II of the steam generator shown in FIG. 1.

For example, the sodium inflow part 123 is provided with two inlet nozzles 231, as shown in FIG. 5. The inlet passage 232 is provided with an inflow rate distribution portion 234 for maintaining the inflow rate of sodium uniformly. For example, the inlet passage 232 is provided with two inflow rate distribution portions 234.

Here, the inflow opening 233 is formed between the first support 532 and the flow distribution type upper support 531. A plurality of rods of a predetermined length and having a predetermined diameter are welded at a predetermined interval between the outer shroud 113 and the outer shroud connection portion 244 so as to connect the outer shroud 113 and the outer shroud connection 244, and sodium flows in the interval between a plurality of welded rods.

Meanwhile, the flow distribution type upper support 531 not only supports the heat transfer tubes 105 but also plays a role in distributing sodium so as to flow it into the heat transfer tube coil portion 115 uniformly. Namely, the sodium flows in through the sodium inflow part 123 and is uniformly distributed, and flows into the heat transfer tube coil portion 115 while it passes between the first support 532 and the flow distribution type upper support 531 provided in the upper header part 102.

A shell gap 116 is formed between the outer shroud 113 and the main shell 111 that are separated at a predetermined interval below the inflow opening 233. The shell gap 116 bypasses part of the sodium that flows in through the inflow opening 233 so as to flow into the shell gap 116 and flow out through the sodium outflow part 133 below, to compensate the quantity of heat lost to the outside from the surface of the steam generator 100. Here, the shell gap 116 is formed so as to communicate from the inflow opening 233 to the sodium outflow part 133 below. At this time, in the predetermined section adjacent to the bottom of the inflow opening 233 and in the predetermined section adjacent to the top of the sodium outflow part 133, the outer shroud 113 is expanded outward to be in close contact with the main shell 111, to form a section with the shell gap 116 reduced is formed.

The upper inner shroud 242 has a shape with the diameter progressively reduced upwardly according to the shape of the upper heat transfer tube connection part 510, and its top end portion is joined to the bottom of the upper tube sheath 122.

The cover gas space 250 is empty space of a predetermined volume that is formed above the heat transfer tubes 105. The sodium that flows in through the inflow opening 233 flows into the cover gas space 250 through a fine gap between the first support 532 and the heat transfer tubes 105. Since cover gas fills the cover gas space 250, a free liquid surface 251 is formed in the zone where sodium and cover gas come into contact. Here, on one side of the top of the cover gas space 250 a sodium purification unit connector 215 is installed. Therefore, the sodium that flows into the cover gas space 250 is sent to the sodium purification unit through the sodium purification unit connector 215, so the free liquid surface 251 is formed in the location corresponding to the height of the sodium purification unit connector 215.

To alleviate the thermal fatigue of the heat transfer tube 105 in the cover gas space 250, the upper outer shroud 243 is formed so as to extend to a location higher than the free liquid surface 251, and the outside of the heat transfer tube 105 is provided with a protecting membrane 241. The upper outer shroud 243 and the heat transfer tube protecting membrane 241 alleviate the fluctuation of the free liquid surface 251, so as to maintain the surface temperature of the heat transfer tubes 105 relatively uniform and alleviate temperature fluctuation.

A plurality of sodium flow holes 247 are formed where sodium is submerged in the heat transfer tube protecting membrane 241, so that sodium can flow between the heat transfer tubes 105 inside and the cover gas space 250 outside through the heat transfer protecting membrane 241. A plurality of cover gas flow holes 246 are formed above the free liquid surface 251 in the heat transfer tube protecting membrane 241, so that cover gas can flow in and out of the heat transfer tube protecting membrane 241.

The upper portion of the upper inner shroud 242 is provided with a rupture disk 140 to alleviate pressure rise due to rupture when the heat transfer tube 105 is broken. The rupture disk 140 permits communication between the cover gas space 250 and the pressure buffer space 104, and is placed in the location corresponding to the top of the free liquid surface 251 in the cover gas space 250.

The rupture disk 140 is ruptured when the internal pressure of the steam generator 100 rises and reaches a predetermined pressure due to the reaction of sodium and water when the heat transfer tube 105 is broken. By the rupture of the rupture disk 140, the gas inside the steam generator 100 flows out into the pressure buffer space 104 so as to alleviate pressure rise inside the steam generator 100. Therefore, the rupture disk 140 plays a role of securing time until emergency action (for example, action of steam discharge valve (not shown) or water supply cut-off valve (not shown)) is taken.

Here, the pressure at which the rupture disk 140 is ruptured is set high enough to prevent unexpected rupture of the rupture disk 140 while the steam generator is in operation; and low enough to the extent that the rupture disk 140 can be ruptured without delay in case the heater transfer tube 105 is damaged.

Also in the upper portion of the upper inner shroud 242 a plurality of pressure maintaining holes 245 are formed for communicating the cover gas space 250 and the pressure buffer space 104. The pressure maintaining holes 245 are formed in a location higher than the rupture disk 104 to play a role of maintaining the pressure in the cover gas space 250 and the pressure in the pressure buffer space 104 uniformly.

Meanwhile, on one side of the upper shell 121 corresponding to the upper portion of the cover gas space 250 a cover gas inlet line 252 for supplying cover gas to the cover gas space 250, a cover gas outlet line 253 and a cover gas supply unit 255 are provided. Also, though not shown in the drawings, on one side in the cover gas space 250 a temperature sensor and water level sensor may be installed.

Lower Header Part

Figure 3:
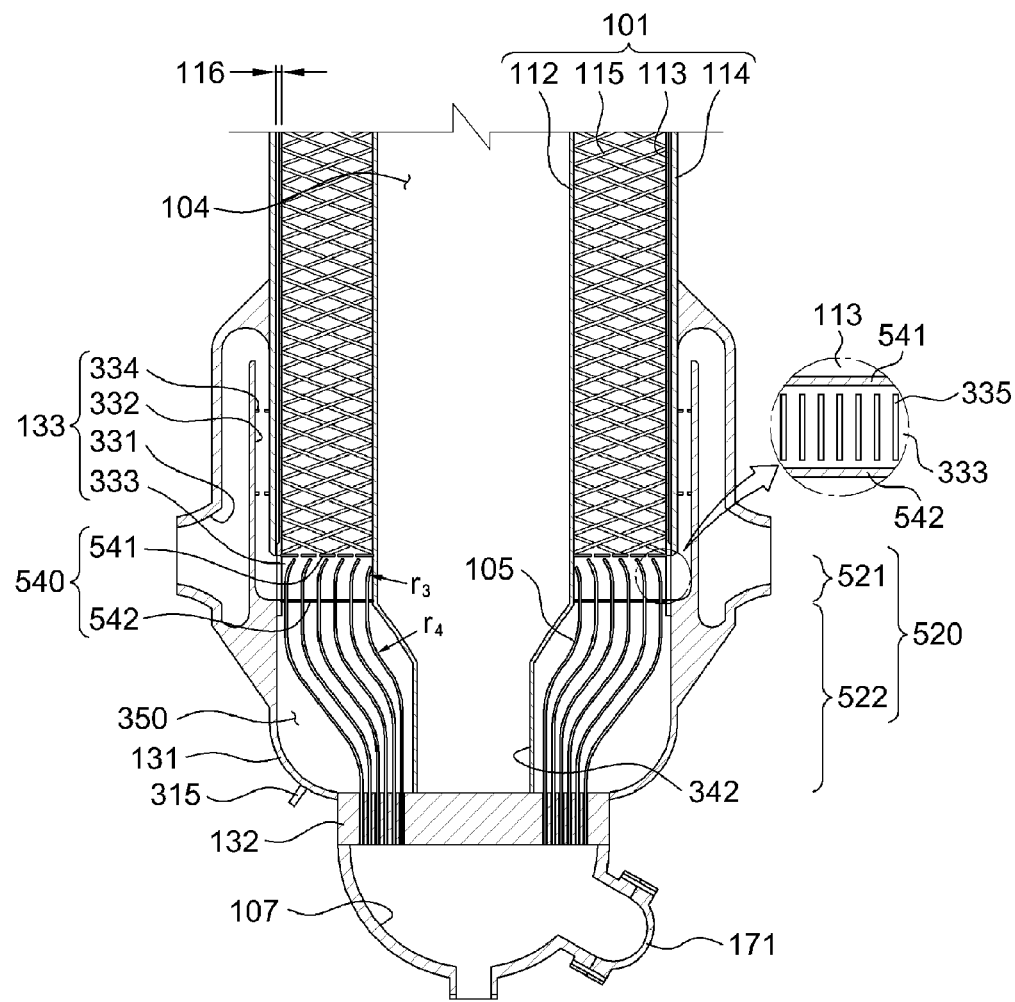
FIG. 3 is a longitudinal sectional view illustrating a lower header of the steam generator shown in FIG. 1.

The lower header part 103 will be described in more detail with reference to FIG. 3. FIG. 3 is a longitudinal sectional view illustrating the lower header part 103 of the steam generator 100 shown in FIG. 1, and in the circle an enlarged view of the major part of sodium outflow opening 333 is placed.

Referring to FIG. 3, the lower header part 103 is provided with a lower shell 131, a lower tube sheath 132, a sodium outflow part 133, and a water supply header 107.

The lower portions of the heat transfer tubes 105 that are elongated and connected to the lower tube sheath 132 are provided with a lower heat transfer tube support part 540 and a lower heat transfer tube connection part 520, for supporting the heat transfer tubes 105 between the heat transfer tube coil portion 115 and the lower tube sheath 132. In the lower heat transfer tube connection part 520, the heat transfer tube 105 is bent at a predetermined bending radius to be joined the lower tube sheath 132 in the portion where the heat transfer tube coil portion 115 terminates. The lower heat transfer tube support part 540, which supports the lower heat transfer tube connection part 520, is provided with a flow distribution type lower support 541 and a third support 542 in sequence downward from the heat transfer tube coil portion 115.

The lower heat transfer tube connection part 520, which is joined to the lower tube sheath 132, is provided with a third bending portion 521, where the heat transfer tube 105 is bent at a bending radius r3 between the flow distribution type lower support 541 and the third support 542, a fourth bending portion 522, where the heat transfer tube 105 is bent at twice at bending radius r4 between the third support 542 and the lower tube sheath 132. For example, the heat transfer tube 105 is bent at a bending radius r3 of 520 mm in the portion where the heat transfer tube coil portion 115 is terminated and at 60° with respect to the flow distribution type lower support 541, to form the third bending portion 521, before it passes across the third support 542. Subsequently, the heat transfer tube 105 is bent at twice at a bending radius r4 of 600 mm and at 52° with respect to the horizontal, like the second bending portion 512, to form the fourth bending portion 522.

The lower tube sheath 132 has a plurality of heat transfer tube holes 321 (see FIG. 10) for joining heat transfer tubes 105, so they can be inserted into the heat transfer tube holes 321, before they can penetrate the lower tube sheath 132 and then be joined to it. At this time, the heat transfer tube 105 has only its appearance fixed by welding on the top of the lower tube sheath 132, and after it penetrates the lower tube sheath 132, both of its inner tube and outer tube are fixed to the lower tube sheath 132 by welding on the bottom of the lower tube sheath 132 of the opposite side.

The lower shell 131 that is joined to the main shell 111 has the sodium outflow part 133 formed on one side so as to communicate with the heat transfer tube coil portion 115 and has the lower tube sheath 132 and the water supply header 107 provided below it.

The inside of the lower shell 131 is provided with a lower inner shroud 342 for housing the lower heat transfer tube connection part 520. Inside the lower shell 131 is also formed a sodium plenum 350 for absorbing the volume expansion of sodium contained therein.

A lower inner shroud 342 has a shape of whose the diameter is gradually reduced downward according to the shape of the lower heat transfer tube connection part 520, and its top end portion is joined to the lower tube sheath 132.

The sodium plenum 350 has an outflow valve 315 provided on the bottom. For instance, four outflow valves 315 are provided along the outer circumference of the sodium plenum 350 at an interval of 90°. Here, sodium flows out through a fine gap formed between the third support 542 and the heat transfer unit 105, and the sodium that flows out like this is collected in the sodium plenum 350 before it flows out into the main pipe through the outflow valve 315. The sodium that flows in the sodium plenum 350 flows into the main pipe, so stratified flow is prevented because the sodium of the sodium plenum 350 is supercooled.

The sodium outflow part 133 includes an outlet nozzle 331 connected to the reactor (not shown) through pipe, an outflow opening 333 communicated with the heat transfer tube coil portion 115, and an outlet passage 332 which is formed between the outlet nozzle 331 and the outflow opening 333 for sodium to flow.

Figure 6:
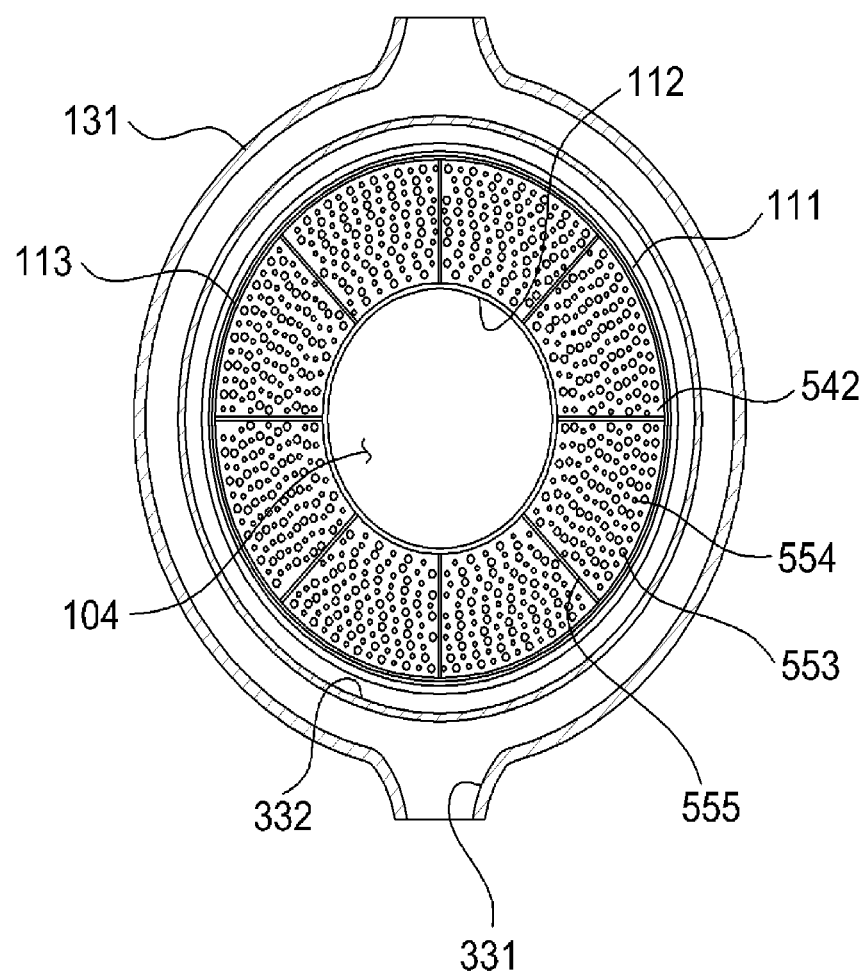
FIG. 6 is a cross sectional view illustrating the flow distribution type lower support taken along line III-III in the steam generator of FIG. 1.

For example, the sodium outflow part 133 is provided with two outlet nozzles 331 as shown in FIG. 6.

The outlet passage 332 is provided with an outflow rate distribution portion 334 for maintaining a uniform outflow rate of sodium. For example, the outlet passage 332 is provided with two outflow rate distribution portions 334.

Here, the outflow opening 333 has a plurality of slits formed so that sodium can flow out after penetrating the outer shroud 113 that is between the flow distribution type lower support 541 and the third support 542. In detail, as shown in enlargement in the circle of FIG. 3, slits 335 are formed long vertically between the flow distribution type lower support 541 and the third support 542. Multiple such slits 335 are formed at a predetermined interval along the circumference of the outer shroud 113.

Meanwhile, the flow distribution type lower support 541 not only supports the heat transfer tubes 105 but also plays a role of maintaining uniform the sodium flow distribution of the heat transfer tube coil portion 115. Namely, the sodium flowing out from the heat transfer tube coil portion 115 passes between the flow distribution type lower support 541 and the third support 543 to be distributed uniformly and flows out of the outflow opening 333.

Heat Transfer Tube Support Part

Figure 4:
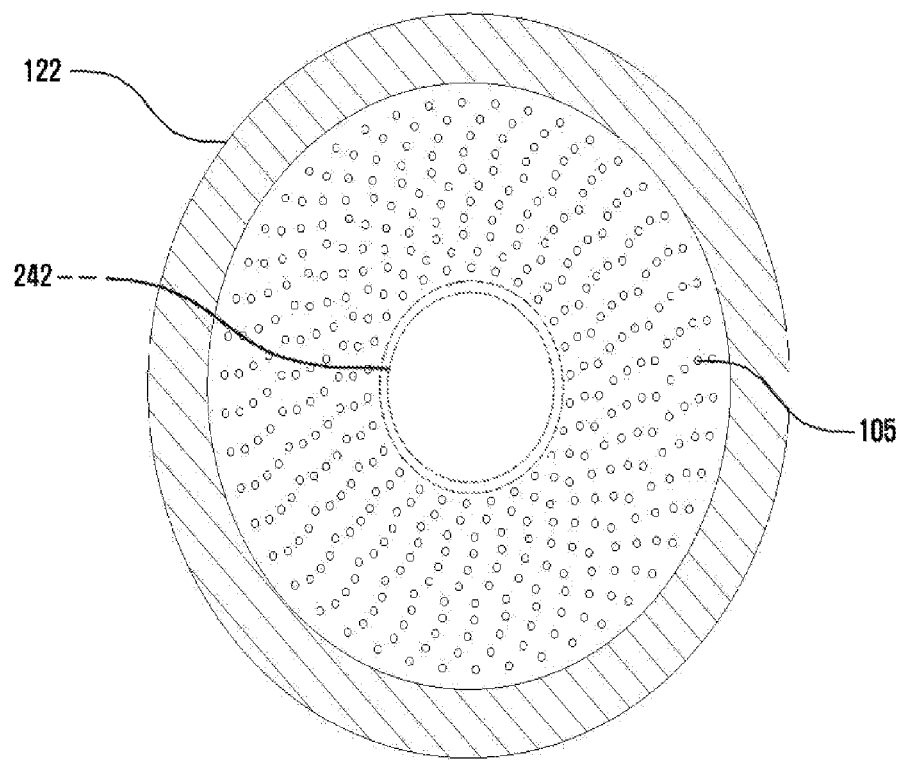
FIG. 4 is a cross sectional view illustrating the upper tube sheath taken along line I-I of the steam generator shown in FIG. 1.
Figure 7:
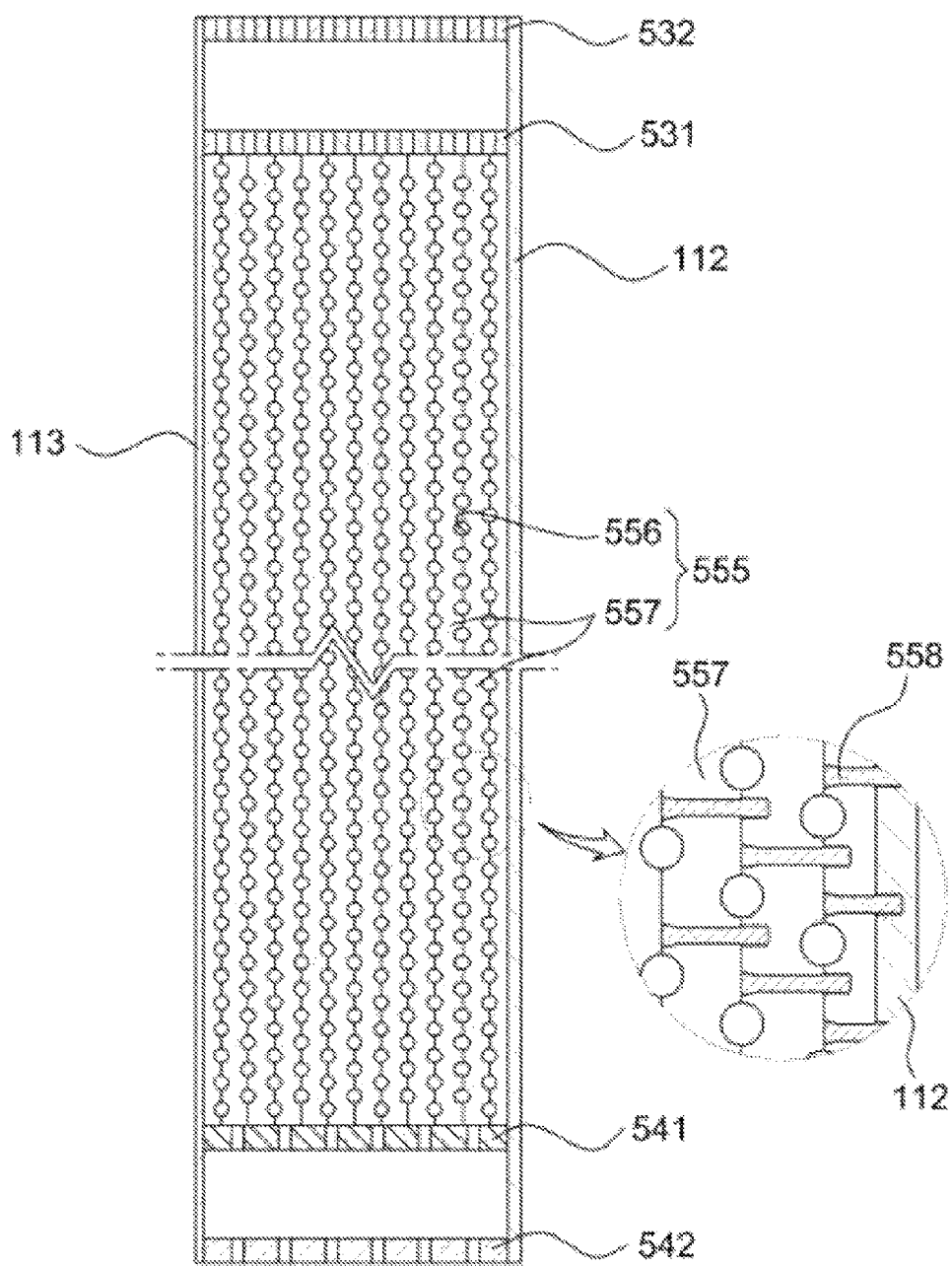
FIG. 7 is a front view illustrating the heat transfer tube coil support of the steam generator shown in FIG. 1.

The heat transfer tube support parts will be described in more detail with reference to FIGS. 4 to 7. FIG. 4 is a cross sectional view illustrating the upper tube sheath 122 taken along line I-I of the steam generator 100 shown in FIG. 1, FIG. 5 is a cross sectional view illustrating the flow distribution type upper support 531 taken along line II-II of the steam generator 100 shown in FIG. 1, FIG. 6 is a cross sectional view illustrating the flow distribution type lower support 541 taken along line III-III in the steam generator 100 of FIG. 1, and FIG. 7 is a front view illustrating a part of the heat transfer tube coil support 555 of the steam generator shown in FIG. 1

Referring to FIG. 4, the upper tube sheath 122 has a plurality of holes for joining heat transfer tubes 105, so that they can be inserted into the holes, and the upper inner shroud 242 is fixed to the center of the upper tube sheath 122 by welding. The upper and lower tube sheaths 122 and 132, where the heat transfer tubes 105 are fixed, are provided on the top and bottom of the steam generator 100 respectively, so they not only support the heat transfer tube coil portion 115, but also play a role of communicating the heat transfer tubes 105 with the steam header 106 and the water supply header 107.

Referring to FIG. 5, in the flow distribution type upper support 531 a plurality of heat transfer penetration holes 552 can be formed for the heat transfer tubes to penetrate, and a plurality of orifices 551 having different diameters can be formed. The flow distribution type upper support 531 plays a role of distributing sodium uniformly for sodium to flows into the heat transfer tube coil portion 115 by maintaining the flow rate constant while sodium passes through the orifices 551.

Meanwhile, the flow distribution type upper support 531 and the first support 532 are supported by the inner shroud 112 and the outer shroud 113, and the second support 533 is supported by the heat transfer tube protecting membrane 241 connected to the outer shroud connection portion 244 and the upper inner shroud 242.

Referring to FIG. 6, the flow distribution type lower support 541 has a shape substantially identical to the flow distribution type upper support 531. In the flow distribution type lower support 541 a plurality of heat transfer tube penetration holes 553 are formed for heat transfer tubes 105 to penetrate, and a plurality of flow distribution orifices 554 are also formed, having different diameters for maintaining the flow rate of sodium constant.

Meanwhile, between the flow distribution type upper support 531 and the flow distribution type lower support 541, a heat transfer coil support 555 is provided in the heat transfer tube coil portion 115 to support the heat transfer tube coil portion 115.

Referring to FIG. 7, the heat transfer tube coil supports 555 are arranged along a direction of the radius of the steam generator 100 at intervals in the direction of the circumference of the steam generator 100. In the heat transfer tube coil supports 555 a plurality of heat transfer tube coil holes 556 are formed for the heat transfer tubes 105 to penetrate, so that the heat transfer tubes 105 are wound in a form of penetrating the heat transfer tube coil supports 555, and have a plate shape as a whole.

Here, the heat transfer tube coil supports 555 are formed of a plurality of subplates 557, in which semicircular grooves are formed, so two subplates 577 are combined to form one heat transfer tube coil hole 556. The subplates 557 are fastened to each other by bolts 558, as shown in FIG. 7.

The top end and bottom end of the heat transfer tube coil support 555 are fixed, respectively, to the flow distribution type upper support 531 and the flow distribution type lower support 541, and on the outer circumference of the inner shroud 112 and the inner circumference of the outer shroud 113 grooves are formed (not shown) for the heat transfer tube coil supports 555 to be inserted and fixed.

In addition, one subplate 557 is mounted in the groove (not shown) that is formed in the inner shroud 112, and the heat transfer tubes 105 are mounted in the heat transfer tube hole 556 of the subplate 557, and another subplate 557 is fitted into the heat transfer tube hole 556, and then it is fastened by bolts 558. After mounting and fastening the subplates 557 and the heat transfer tubes 105 repeatedly in this sequence, the outer shroud 113 is installed outside the final subplates 557. Also, above and below the heat transfer tube coil supports 555, formed as described above the flow distribution type upper support 531 and the flow distribution type lower support 541, respectively, are installed to form the heat transfer tube coil supports 555 and the heat transfer tube coil portion 115.

Heat Transfer Tube

Figure 8:
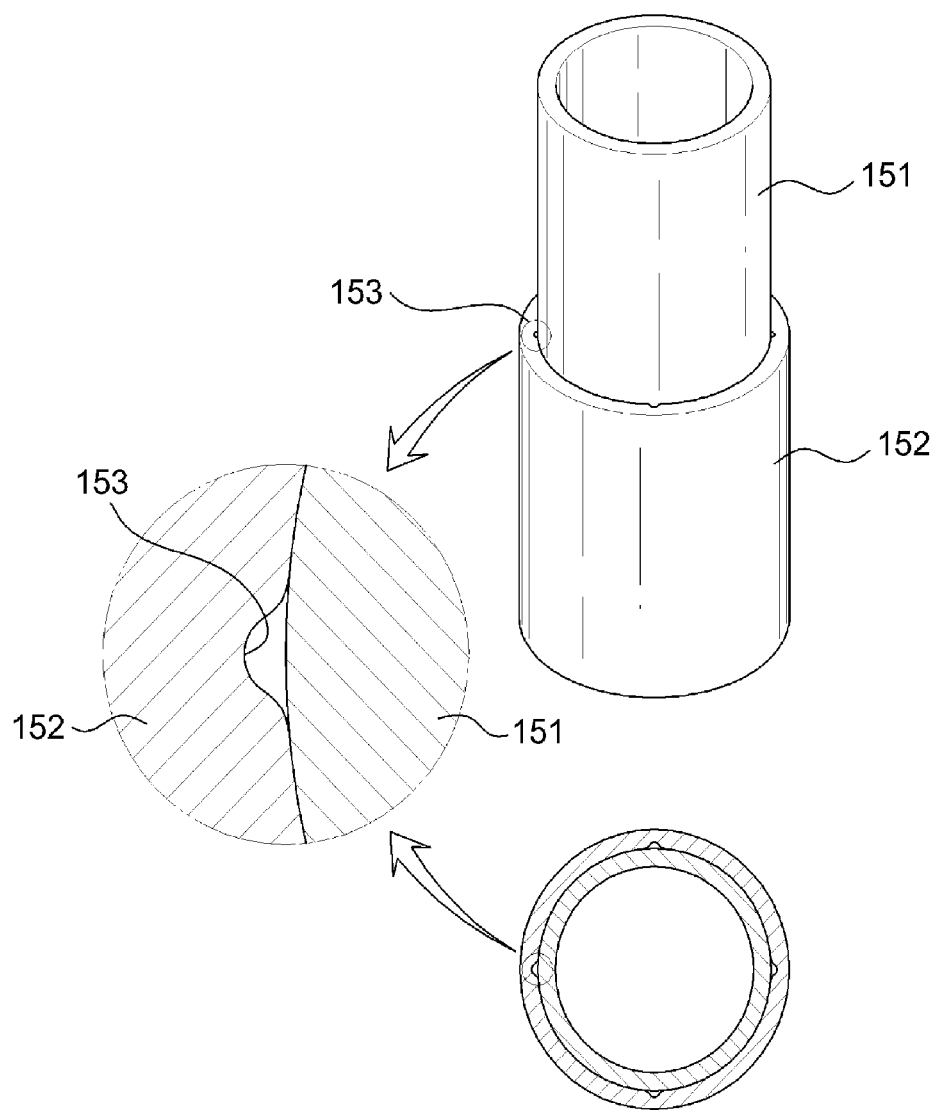
FIG. 8 is a perspective view illustrating a major part composing the heat transfer tube of a double-wall tube structure according to a preferred embodiment of the present invention.

The heat transfer tube 105 of a double-wall tube structure according to the preferred embodiment of the present invention will be described in detail with reference to FIG. 8. FIG. 8 is a perspective view illustrating the major part of the heat transfer tube 105 according to the preferred embodiment of the present invention. In the lower portion of the drawing a sectional view of the heat transfer tube 105 is shown, and in the circle an enlarged view of the helium flow groove 153, formed in the heat transfer tube 105, is shown.

Referring to FIG. 8, the heat transfer tube 105 has a double-wall structure in which the inner tube 151 and the outer tube 152 are in close contact, and the materials of the inner tube 151 and the outer tube 152 are different. The helium flow groove 153 for helium gas flowing lengthwise of the heat transfer tube 105 is formed between the inner tube 151 and the outer tube 152.

The helium flow groove 153 is formed on the outside of the inner tube 151 or on the inside of the outer tube 152. For example, the helium flow groove 153 is formed concavely on the inside of the outer tube 152 in the process of manufacturing the outer tube 152, and four helium flow grooves 153 are formed along the inner circumference of the outer tube 152. Helium gas flows along the inner space of the helium flow grooves 153, which communicate with a heat transfer tube damage detection unit 400 (See FIG. 9), to be described later, for detecting whether or not the heat transfer tube 105 is damaged.

Here, if a gap occurs because the inner tube 151 and the outer tube 152 that compose the heat transfer tube 105 of a double-wall structure are not in close contact, there is a problem that the heat transfer efficiency could decrease, since helium gas in the helium flow groove 153 flows out to fill between the inner tube 151 and the outer tube 152. To prevent such a problem, the inner tube 151 is inserted concentrically into the outer tube 152 so as to be in close contact with each other, before the heat transfer tube 105 is formed by a drawing process. At this time, it is preferable to make these components so that residual stress of 10 to 15 MPa is formed in the interface between the inner tube 151 and the outer tube 152.

Meanwhile, during the operation of the steam generator 100, the inflow temperature of sodium is 520° C., the outflow temperature is 335° C., the water supply temperature is 230° C., and the outflow temperature of steam is 490° C. Under such operational conditions of the steam generator 100, a large temperature difference occurs in the heat transfer tube 105 between the inner tube 151 in contact with water and the outer tube 152 in contact with sodium. In order to prevent the decrease in the degree of close contact between the inner tube 151 and the outer tube 152 due to heat expansion, the heat transfer tube 105 is formed with material having the thermal expansion coefficient of the outer tube 152 less than that of the inner tube 151. For example, it is preferable to form the outer tube 152 with material having a thermal expansion coefficient about 10 to 15% higher than that of the inner tube 151.

For example, the heat transfer tube 105 may be formed of chromium molybdenum steel (Cr—Mo steel), and the inner tube 151 with 2¼Cr-1Mo steel, and the outer tube with 9Cr-1Mo steel. It is also possible to form the inner tube 151 with 9Cr-1Mo steel and the outer tube 152 with 12Cr steel. The heat transfer tube 105 formed from such material has the heat transfer efficiency similar to that at room temperature, even when the temperature difference between the inner tube 151 and the outer tube 152 is about 55° C.

Meanwhile, a test was conducted to see whether or not the heat transfer tube 105 is safe. The results showed that when the temperature of the inner tube 151 and the outer tube 152 is maintained at 550° the stress generated in the heat transfer tube 105 due to the difference in thermal expansion coefficients between the inner tube 151 and outer tube 152 was about 11.2 MPa, as calculated by using ANSYS. This value is much lower than the yield stress of the heat transfer tube 105, so it was found to be safe.

The heat transfer tube 105 has the degree of heat expansion similar between the inner tube 151 and the outer tube 152 during normal operation of the steam generator 100, so the inner tube 151 and the outer tube 152 maintain a condition of close contact, which prevents the decrease in heat transfer efficiency of the heat transfer tube 105.

Heat Transfer Tube Damage Detection Unit

Figure 9:
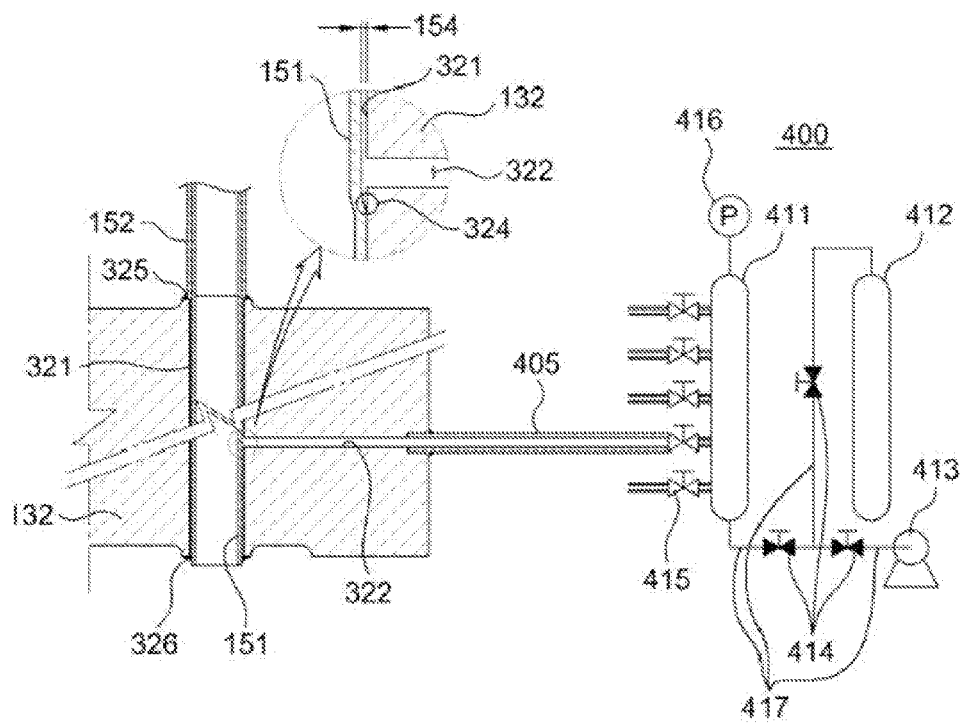
FIG. 9 is a schematic view for describing the construction and operation of a heat transfer tube damage detection unit according to a preferred embodiment of the present invention.
Figure 10:
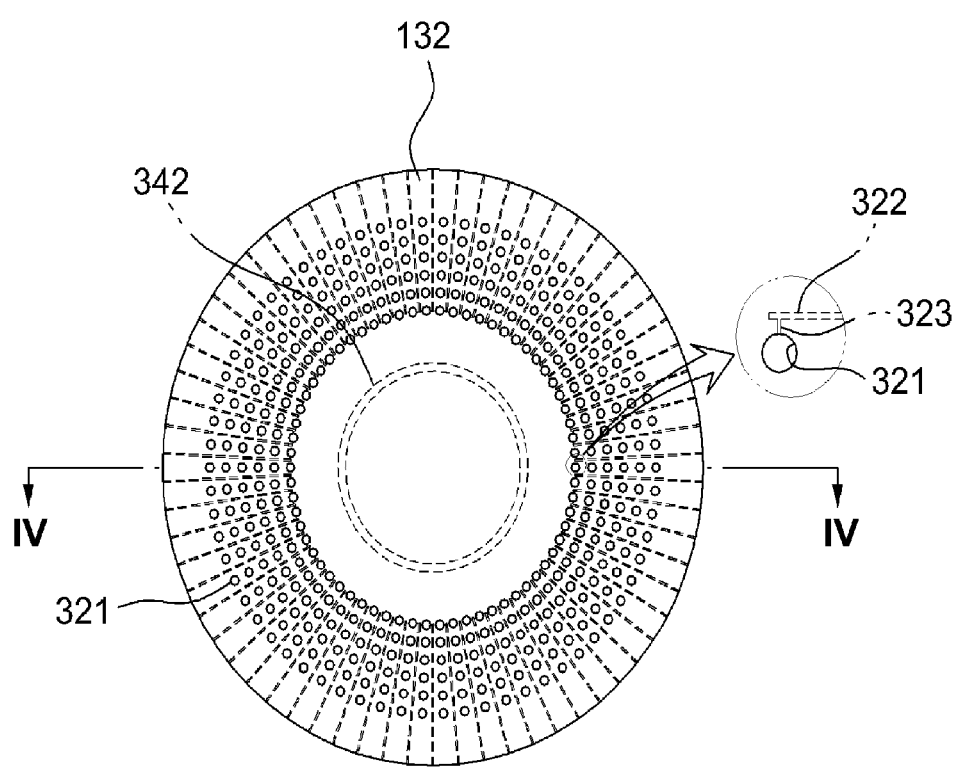
FIG. 10 is a view illustrating the lower tube sheath of the heat transfer tube damage detection unit shown in FIG. 9
Figure 11:
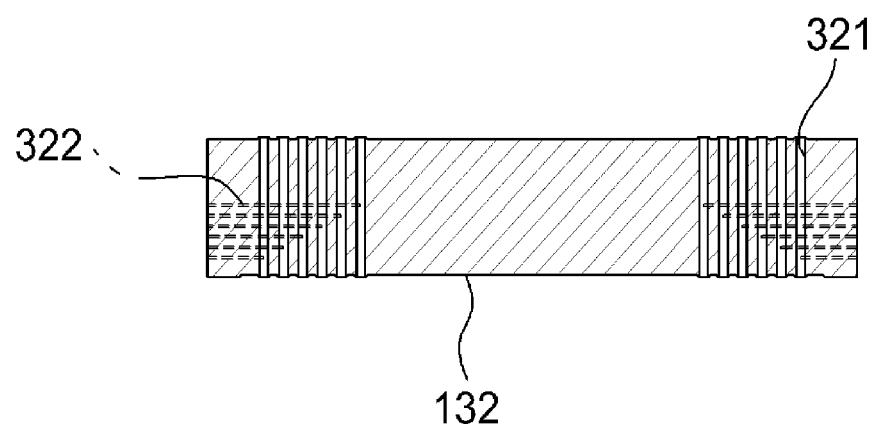
FIG. 11 is a cross sectional view illustrating the lower tube sheath taken along line IV-IV of the steam generator shown in FIG. 1.

The construction and operation of a heat transfer tube damage detection unit 400 according to the preferred embodiment of the present invention will be described in detail with reference to FIG. 9 and FIG. 10. Here, FIG. 9 is a schematic view illustrating the heat transfer tube damage detection unit 400 according to the preferred embodiment of the present invention, and FIG. 10 is a cross sectional view illustrating the lower tube sheath 132 taken along line IV-IV in the steam generator 100 of FIG. 1. In the lower portion of the drawing is placed a longitudinal section of the lower tube sheath 132 taken along line V-V in the cross sectional view illustrating the lower tube sheath 132.

Referring to FIG. 9, in order for helium gas to flow in, the heat transfer unit damage detection unit 400 includes a helium plenum 411 communicating with the helium flow groove 153 through the lower tube sheath 132, and a pressure gage 416 for measuring the pressure of the helium gas that flows into the helium plenum 411, in order to detect whether or not the heat transfer tube 105 is damaged.

In order to communicate the heat transfer tube damage detection unit 400 and the helium flow groove 153, a plurality of the heat transfer tube holes 321 for the heat transfer tubes 105 to be inserted, and a plurality of detection holes 322 communicating with the heat transfer tube holes 321 so as to be connected with helium flow grooves 153, are formed in the lower tube sheath 132. Also, the detection holes 322 and the helium plenum 411 are connected by a plurality of connecting tubes 405, so the flow of helium is possible through the connecting tubes 405.

The heat transfer tube hole 321 is formed so that one heat transfer tube 105 is inserted into one hole to be combined, and the heat transfer tube hole 321 and the detection hole 322 are formed in one-to-one correspondence, so as to communicate between the heat transfer tube holes 321 and the helium plenum 411 independently. For example, the heat transfer tube holes 321 are arranged radially along the direction of the circumference of the lower tube sheath 132.

The outer tube 152 of the heat transfer tube 105 is joined to the top end of the lower tube sheath 132, and the inner tube 151 is inserted into the heat transfer tube hole 321 and penetrates the lower tube sheath 132, before it is joined to the bottom end of the lower tube sheath 132. Here, space between the outer circumference of the inner tube 151 and the inner circumference of the heat transfer tube hole 321 is separated at a predetermined interval to form a heat transfer tube gap 154. The heat transfer tube gap 154 communicates with the helium flow groove 153, so helium gas flows into it.

The helium gas that flows into the heat transfer tube gap 154 from the helium flow groove 153 is supplied to the helium plenum 411 through the detection hole 322 and the connecting tube 405.

Here, the heat transfer tube gap 154 is sealed off from the outside by the outer tube weld 325 of the outer tube 152 welded to the lower tube sheath 132 and by the inner tube weld 326 of the inner tube 151 welded to the lower tube sheath 132. Therefore, the helium gas that flows into the heat transfer tube gap 154 is prevented from flowing out into the steam generator 100 or the water supply header 107, while flowing into the detection hole 322.

Especially, to block the heat transfer tube gap 154, the sealed portion 324 is formed below the place adjacent to the portion, where the heat transfer tube gap 154 and the detection hole 322 meet. For example, the sealed portion 324 may be formed to be in close contact with the inner wall of the heat transfer tube hole 321 by expanding the diameter of the inner tube 151.

The heat transfer tube 105 according to the present embodiment has a plurality of helium flow grooves 153 and heat transfer tube gaps 154 formed therein, so the helium gas that flows in through the helium flow grooves 153 can flows into one detection hole 322. Therefore, the structure of the lower tube sheath 132 and the detection hole 322 can be simplified. Also, by forming the heat transfer gap 154 only to the location of the detection hole 322 so as to minimize the occurrence of the change in the flow rate of the helium gas that flows into the detection hole 322 from the heat transfer tube gap 154, it is possible to minimize the measurement error occurring in the heat transfer tube damage detection unit 400.

As shown in FIG. 10, the detection hole 322 is formed in the direction of the radius of the lower tube sheath 132 so as to communicate with the side of the lower tube sheath 132. Also, because the number of the detection holes 322 is large, the detection holes 322 may be formed in different depths to secure the diameter of the detection hole 322 and prevent the detection holes 322 from interfering with each other. Namely, a certain number of heat transfer tube holes 321 are arranged in a straight line along the direction of the radius of the lower tube sheath 132, and the detection holes 322 that communicate with the heat transfer tube holes 321 in a straight line are formed with the depth deeper or lower in sequence lengthwise of the lower tube sheath 132. As shown in a dotted straight line in FIG. 10, the detection holes 322 may be formed with the depth only different at the same location. The heat transfer tube holes 321 and the detection holes 322 are formed symmetrically relative to the center point of the lower tube sheath 132.

Here, the connecting hole 323 shown in FIG. 10 makes the heat transfer tube hole 321 and the detection hole 322 communicate.

The connecting tube 405 is provided on the outside of the lower tube sheath 132 so as to communicate with the detection hole 322, and each detection hole 322 communicates with the helium plenum 411 through the connecting tube 405.

Each connecting tube 405 is provided with first valves 415. Therefore, when damage to the heat transfer tube 105 is detected by the heat transfer tube damage unit 400, the relevant heat transfer tube 105 is closed by closing the first valve 415, to close the connecting tube 405 connected to the damaged heat transfer tube 105. Here, each connecting tube 405 is provided with the first valve 415 so as to independently close the damaged heat transfer tube 105. Also, it is connected normally open, so that helium gas can be flowed into the helium plenum 411 from the helium flow grove 153.

In order to selectively pressurize or depressurize the helium plenum 411, a helium tank 412 and a vacuum pump 413 are provided on one side of the helium plenum 411.

Second valves 414 are provided on the connecting pipes for connecting the helium plenum 411, the helium tank 412, and the vacuum pump 413. The second valves 414 are installed on the connecting pipes in a normally closed state. Especially, the second valves 414 are provided to doubly close the connecting pipes among the helium plenums 411, the helium tank 412 and the vacuum pump 413.

Here, the number of the helium plenums 411 provided in the heat transfer tube damage detection unit 400 is determined by considering the sensitivity and failure probability of the instruments, such as the pressure gauge 416.

Meanwhile, since the boiling point of sodium in atmospheric pressure is 883° C., the pressure outside the heat transfer tube 105 is a little higher than atmospheric pressure, and since steam is generated inside the heat transfer tube 105, the pressure is about as high as 16.5 MPa. The helium gas provided in the helium flow groove 153 is maintained at a pressure of about 2 MPa. Therefore, when the outer tube 152 is damaged, helium gas leaks toward sodium, while the pressure inside the helium flow groove 153 drops, and when the inner tube 151 is damaged, high-pressure steam flows into the helium flow groove 153, while the pressure rises. Therefore, the heat transfer tube damage detection unit 400 can detect whether or not the heat transfer tube 105 is damaged by measuring the pressure change of the helium gas flowing into the helium plenum 411 through the helium flow groove 153.

Below, the operation of the heat transfer tube damage detection unit 400 will be described briefly.

First, the heat transfer tube damage detection unit 400 monitors whether or not the heat transfer tube 105 is damaged by measuring the pressure change of the helium gas flowing into the helium plenum 411. At this time, when the damage to the heat transfer tube 105 is detected, it plugs the top and bottom of the damaged heat transfer tube 105, respectively. The plugging of the heat transfer tube 105 can be executed through the inspection ports 161 and 171 provided in the water supply header 107 and the steam header 106.

Next, the first valve 415 is closed to close the connecting tube 405 connected to the damaged heat transfer tube 105. It is also possible to close by welding the connecting tube 405 itself that is connected to the damaged heat transfer tube 105.

Next, cover gas is filled in the damaged heat transfer tube 105.

Here, when filling cover gas in the damaged heat transfer tube 105, it is also possible to selectively mix in traceable material.

Although the present invention has been described in detail reference to its presently preferred embodiment, it will be understood by those skilled in the art that various modifications and equivalents can be made without departing from the spirit and scope of the present invention, as set forth in the appended claims.

What is claimed is:

1. A heat transfer tube damage detection unit of a steam generator for a sodium-cooled fast reactor, detection unit comprising:
   - plurality of heat transfer tubes, wherein each is formed as a dual tube having an inner tube and an outer tube enclosing the inner tube, and having flow grooves formed between the inner tube and the outer tube for flowing gas;
   - a lower tube sheath for receiving the heat transfer tubes;
   - a plurality of detection holes formed by penetrating the lower tube sheath that has the heat transfer tube joined so as to communicate with the flow grooves;
   - a plenum selectively coupled to the detection holes using connecting tubes for the gas to flow into the flow grooves; and
   - a pressure gauge for measuring a pressure of the gas flowing into the plenum to detect whether the heat transfer tube is damaged,
   - wherein a plurality of heat transfer tube holes are formed in the lower tube sheath, in the heat transfer tubes extending into the heat transfer tube holes;
   - the outer tube is joined to a first surface of the lower tube sheath and the inner tube penetrates the heat transfer tube hole to join to a second surface of the lower tube sheath;
   - a gap between the heat transfer tube holes and the inner tube is in communication with the flow grooves;
   - the heat transfer tube holes are radially arranged along the lower tube sheath, and
   - each detection hole communicates with a corresponding heat transfer tube hole, and also communicates with its side along a radial direction of the lower tube sheath, and
   - wherein the plurality of detection holes are arranged on a straight line along the radial direction and are formed at different depths in the lower tube sheath.

2. The detection unit of claim 1, wherein each of the connecting tubes has a first valve for connecting the detection holes and the plenum, and
   - wherein the first valves are installed on the connecting tubes in a normally open state, and can close each corresponding connecting tube when the heat transfer tube is damaged.

3. The detection unit of claim 1, further comprising a gas tank and a vacuum pump for selectively pressurizing and depressurizing the plenum.

4. The detection unit of claim 3, wherein a plurality of gas tubes are provided to connect the plenum, the gas tank and the vacuum pump, and wherein each of the gas connecting tubes has a second valve for connecting the plenum, the gas tank, and the vacuum pump, and
   - wherein the second valves are installed on the gas tubes in normally closed state, and are provided to doubly close the connecting.

* * * * *